(12) United States Patent
Pidcock et al.

(10) Patent No.: US 8,365,531 B2
(45) Date of Patent: Feb. 5, 2013

(54) FUEL INJECTOR

(75) Inventors: Anthony Pidcock, Derby (GB); Michael P Spooner, Derby (GB)

(73) Assignee: Rolls-Royce PLC, London (GB)

( * ) Notice: Subject to any disclaimer, the term of this patent is extended or adjusted under 35 U.S.C. 154(b) by 902 days.

(21) Appl. No.: 12/312,582

(22) PCT Filed: Nov. 19, 2007

(86) PCT No.: PCT/GB2007/004380
§ 371 (c)(1),
(2), (4) Date: May 18, 2009

(87) PCT Pub. No.: WO2008/071902
PCT Pub. Date: Jun. 19, 2008

(65) Prior Publication Data
US 2010/0050644 A1    Mar. 4, 2010

(30) Foreign Application Priority Data
Dec. 15, 2006 (GB) .................... 0625016.1

(51) Int. Cl.
*F02C 1/00* (2006.01)
(52) U.S. Cl. .......................................... 60/737
(58) Field of Classification Search ............ 60/737, 60/740, 742, 743, 746–748
See application file for complete search history.

(56) References Cited

U.S. PATENT DOCUMENTS

| | | | |
|---|---|---|---|
| 4,766,722 A | 8/1988 | Bayle-Laboure et al. | |
| 6,272,840 B1 | 8/2001 | Crocker et al. | |
| 6,363,726 B1* | 4/2002 | Durbin et al. | 60/748 |
| 6,418,726 B1 | 7/2002 | Foust et al. | |
| 2005/0039456 A1 | 2/2005 | Hayashi | |
| 2006/0021350 A1 | 2/2006 | Sanders | |
| 2006/0248898 A1 | 11/2006 | Buelow et al. | |
| 2007/0028617 A1* | 2/2007 | Hsieh et al. | 60/737 |
| 2007/0289305 A1* | 12/2007 | Oda et al. | 60/748 |
| 2008/0236165 A1* | 10/2008 | Baudoin et al. | 60/746 |
| 2009/0173076 A1* | 7/2009 | Toon | 60/746 |

FOREIGN PATENT DOCUMENTS

| | | |
|---|---|---|
| EP | 1 186 832 A3 | 3/2002 |
| EP | 1 193 448 A3 | 4/2002 |
| EP | 1 672 282 A1 | 6/2006 |
| EP | 1 719 950 A2 | 11/2006 |
| JP | A-2004-226051 | 8/2004 |
| WO | WO 03/091557 A1 | 11/2003 |

* cited by examiner

*Primary Examiner* — Phutthiwat Wongwian
(74) *Attorney, Agent, or Firm* — Oliff & Berridge, PLC

(57) ABSTRACT

A fuel injector head for a gas turbine engine the head comprising a pilot injector and a main injector located radially outwardly of the pilot injector. A concentric separates the pilot injector from the main injector and bounding a duct through which in use a fuel injected by the pilot injector flows. The splitter is hollow to improve cooling and has a radially inner surface which defines a first portion which tapers radially inwardly to a throat and a second portion which tapers radially outwardly from the throat with the angle of the radially outwards taper being such that a flow of air in use over the radially inner surface remains attached over the length of the surface.

15 Claims, 5 Drawing Sheets

FUEL INJECTOR

BACKGROUND

This invention concerns fuel injector assemblies for gas turbine engines.

There is a continuing need, driven by environmental concerns and governmental regulations, for improving the efficiency of and decreasing the emissions from gas turbine engines of the type utilised to power jet aircraft, marine vessels or generate electricity. Particularly there is a continuing drive to reduce nitrous oxide ($NO_x$) emissions.

Advanced gas turbine combustors must meet these requirements for lower $NO_x$ emissions under conditions in which the control of $NO_x$ generation is very challenging. For example, the goal for the Ultra Efficient Engine Technology (UEET) gas turbine combustor research being done by NASA is a 70 percent reduction in $NO_x$ emissions and a 15 percent improvement in fuel efficiency compared to ICAO 1996 standards technology. Realisation of the fuel efficiency objectives will require an overall cycle pressure ratio as high as 60 to 1 and a peak cycle temperature of 1600° C. or greater. The severe combustor pressure and temperature conditions required for improved fuel efficiency make the $NO_x$ emissions goal much more difficult to achieve.

Conventional fuel injectors that seek to address this issue have concentrically arranged pilot and main injectors with the main injector surrounding the pilot injector. However, conventional injector arrangements have several operational disadvantages, including for example, flame stability and relight characteristics, the potential for excessive combustor dynamics or pressure fluctuations caused by combustor instability. Combustion instability occurs when the heat release couples with combustor acoustics such that random pressure perturbations in the combustor are amplified into larger pressure oscillations. These large pressure oscillations, having amplitudes of about 1-5% of the combustor pressure, can have catastrophic con sequences and thus must be reduced or eliminated.

The invention seeks to provide an improved injector that addresses these and other problems.

According to a first aspect of the present invention there is provided a fuel injector head for a gas turbine engine the head comprising: a pilot injector having a central axis, a main injector located radially outwardly of the pilot injector, a concentric splitter separating the pilot injector from the main injector and bounding a volume through which in use a fuel injected by the pilot injector flows and in which combustion of the fuel is initiated; characterised in that the splitter is internally cooled and has a radially inner surface which defines a first portion which tapers radially inwardly to a throat and a second portion which tapers radially outwardly from the throat, wherein the angle of the radially outwards taper is such that a flow of air in use over the radially inner surface remains attached over the length of the surface.

Preferably the pilot injector comprises an annular pilot fuel housing concentric with the central axis, the inner surface of the fuel housing providing a prefilmer surface for the supply of fuel thereto in the form of a film extending to a prefilmer lip wherein the inner surface defines a bore for the supply of air over the prefilmer.

The pilot injector comprises may comprises an annular outer bore concentric with the central axis for the supply of air over the prefilmer lip.

Preferably the radially inner surface of the splitter provides the radially outer wall of the annular outer bore.

Preferably the concentric splitter has a radially outer wall and a cavity between the radially outer wall and the radially inner surface.

SUMMARY

The second portion may have a plurality of passages extending from the cavity for the exit of air from the cavity.

Preferably the splitter comprises a radial end face (34) joining the radially outer surface and the radially inner surface.

The flow of air downstream of the pilot injector provides a large stable central recirculation zone, which while remote from the main zone will allow circulation products to be entrained in the main zone in a controlled manner. The larger circulation zone reduces the bulk velocity immediately in front of the pilot to maximise flame stability and enhance the altitude ignition performance.

The divergent duct provided by the second portion provides an increased flow area that has a beneficial effect on the flow coefficient of discharge that allows smoke emissions to be better controlled without an overall increase in the injector size.

According to a second aspect of the invention there is provided a fuel injector head for a gas turbine engine comprising a pilot injector having a central axis, a main injector concentric with the pilot injector and located radially outwardly thereof, a splitter separating the pilot injector from the main injector and bounding a duct through which in use a fuel injected by the pilot injector flows; characterised in that the splitter has at least one aperture for the supply of a non-combustible fluid to the duct.

Preferably the splitter has a radially inner surface and a radially outer surface. The radially inner surface may define the duct which has a throat, a first portion which tapers radially inwardly to the throat and a second portion which tapers radially outwardly from the throat.

Preferably the radially inner surface of the splitter defines the second portion of the duct comprises the at least one aperture arranged as a circumferentially extending array.

The splitter may have a passage between the radially inner surface and the radially outer surface and from which the non-combustible fluid is supplied to the at least one aperture.

Preferably the splitter has an end face joining the radially inner surface with the radially outer surface. The end face may have a plurality of apertures for directing air towards a combustion chamber.

The pilot injector preferably injects fuel to the duct at a first axial location and the splitter has an inlet aperture for the supply of the non-combustible gas to a passage therein, wherein the inlet aperture is located axially before the axial location of the point of fuel injection.

Beneficially the supply of air to the duct from apertures affects the AFR of the air/fuel mixture of the primary combustion zone without significantly affecting the weak extinction of the flame. The production of smoke can thus be reduced.

According to a third aspect of the invention there is provided a fuel injector for a gas turbine engine comprising: a pilot injector having a central axis, a main injector located radially outwardly of the pilot injector, an internally cooled splitter separating the pilot injector from the main injector and bounding at least part of a premixing duct through which in use a fuel injected by the main injector flows and is mixed with air, the exit of the premixing chamber having an exit plane; characterised in that the radially outer edge of the exit plane is located axially rearward of the radially inner edge of the exit plane.

Preferably the radial outer edge is circular. Preferably the radial inner edge is circular.

Preferably the main injector has a prefilmer over which in use a film of fuel extends to a prefilmer lip where the film is atomised, the prefilmer lip defining the radially outer edge of the exit plane. The main injector may comprises a prefilmer having a lip and an inner annular passage for the supply of air over the lip and a concentric outer annular passage for the supply of air over the lip, wherein the outer annular passage has a radially outer wall the end of which defines the radially outer edge of the exit plane.

Preferably the splitter has a radially inner surface and a radially outer surface and an end wall extending therebetween, wherein the intersection of the radially outer surface and the end wall provides the radially inner edge of the exit plane.

The angle of the exit plane from a radial plane may be from 5 degrees to 20 degrees.

The splitter is located in an extremely hot part of the engine and can easily be damaged by these high temperatures. Aerodynamic features are therefore typically compromised in providing sufficient thermal protection that avoids damage to the splitter. The internal cooling enables the splitter to be extended forwardly to provide a premixing chamber for the main injector and to allow the splitter to protect the delicate prefilmer surface and fuel supply from excess heat.

According to a fourth aspect of the invention there is provided a fuel injector head for a gas turbine engine comprising: a pilot injector having a central axis, the pilot injector being arranged to direct fuel and air to a pilot combustion zone, a main injector located radially outwardly of the pilot injector and being arranged to direct fuel and air to a main combustion zone, a splitter separating the pilot injector from the main injector and having a radially inner surface and a radially outer surface and an end face connecting the inner surface with the outer surface, wherein the end face has a plurality of apertures for directing air towards a combustor chamber, the apertures being supplied with air from a passage within the splitter; characterised in that the passage has metering means to meter the flow of air in the passage and the momentum at the apertures, the momentum being sufficient to delay the mixing of the pilot and main combustion zones.

Preferably the sum of the pressure drop across the metering means and the apertures is from 10% to 90% of the pressure drop across the injector.

According to a fifth aspect of the invention there is provided a fuel injector head for a gas turbine engine comprising: a pilot injector having a central axis, a main injector located radially outwardly of the pilot injector, the main injector having an annular swirl passage for supplying swirling air over a prefilmer, the outer perimeter of the swirl passage having a constant radius and characterised in that the inner perimeter of the of the swirl passage has a varying radius.

Preferably the varying radius provides a plurality of lobes to the annular swirl passage.

The fuel injectors may be provided in a gas turbine engine.

BRIEF DESCRIPTION OF THE DRAWINGS

Embodiments of the present invention will now be described by way of example only and with reference to the accompanying drawings, in which.

DETAILED DESCRIPTION OF EMBODIMENTS

Figure 1:
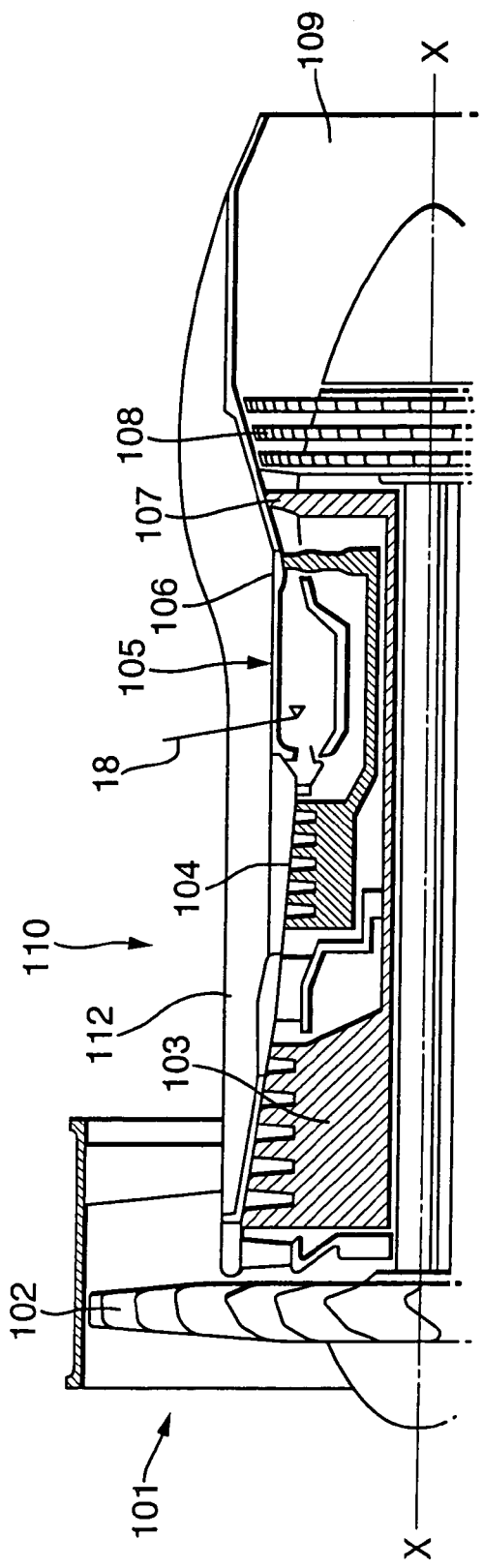
FIG. 1 depicts a general gas turbine engine section.

With reference to FIG. 1, a ducted fan gas turbine engine generally indicated at 110 comprises, in axial flow series, an air intake 101, a propulsive fan 102, an intermediate pressure compressor 103, a high pressure compressor 104, combustion equipment 105, a high pressure turbine 106, an intermediate pressure turbine 107, a low pressure turbine 108 and an exhaust nozzle 109.

Air entering the air intake 101 is accelerated by the fan 102 to produce two air flows, a first air flow into the intermediate pressure compressor 103 and a second air flow that passes over the outer surface of the engine casing 112 and which provides propulsive thrust. The intermediate pressure compressor 103 compresses the air flow directed into it before delivering the air to the high pressure compressor 104 where further compression takes place.

Compressed air exhausted from the high pressure compressor 104 is directed into the combustion equipment 105, where it is mixed with fuel injected through a fuel injector 17 mounted on an injector stalk 18 and the mixture combusted. The resultant hot combustion products expand through and thereby drive the high 106, intermediate 107 and low pressure 108 turbines before being exhausted through the nozzle 109 to provide additional propulsive thrust. The high, intermediate and low pressure turbines respectively drive the high and intermediate pressure compressors and the fan by suitable interconnecting shafts.

Figure 2:
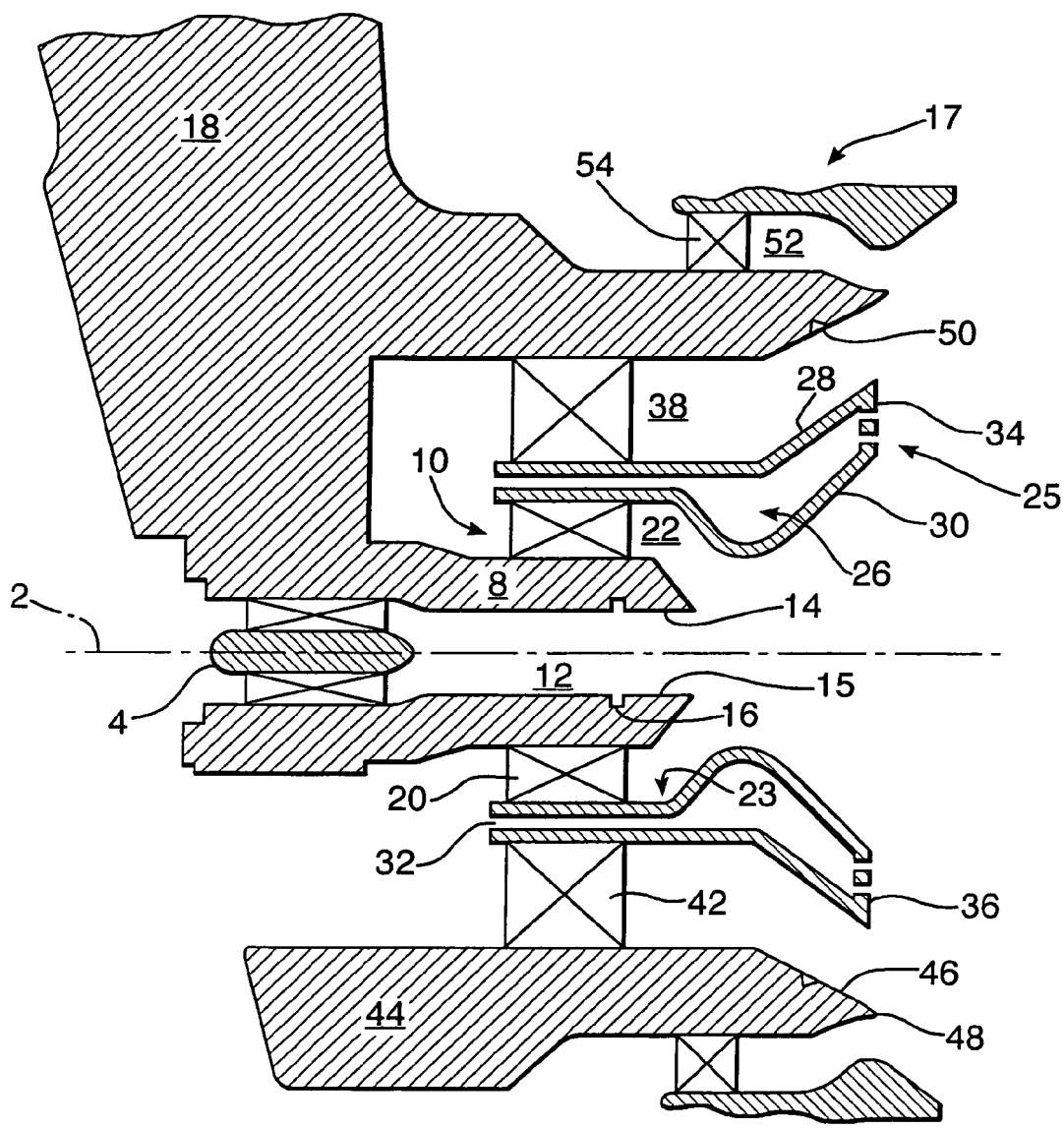
FIG. 2 depicts an embodiment of an injector in accordance with the invention.

FIG. 2 shows a concentrically staged injector 17 in accordance with the invention. The injector has a central axis 2 that extends generally parallel with the main axis, X-X of FIG. 1, of the engine.

A pilot injector 10 is arranged around the axis 2 to inject fuel primarily at low power usage but also some fuel, along with the main injector, at higher power usage. The injector in this embodiment is an airblast injector having a bore 12 defined by a fuel housing 8 the inner surface of which provides a prefilmer surface 14 to which fuel is supplied from passages within the fuel housing.

A centrebody 4 in the bore 12 supports an array of axial swirl vanes 6 that impart swirl to a flow of air through the bore 12 and over the prefilmer surface 14. The air flow is accelerated by the swirl vanes and the imparted tangential momentum directs the flow over the prefilmer such that there is no separation of the boundary layer. The fuel supplied to the prefilmer 14 by slots 16 is accelerated by the swirling air flow and carried as a film to the prefilmer lip 15 at the downstream end of the bore 12, where it is atomised within swirling air from a separate flow of air within an outer swirl passage 22.

The fuel housing 8 provides separation between the bore 12 and the outer swirl passage 22 and provides the outer surface of the bore 12 and the inner surface of the outer swirl passage 22. Fuel passages (not shown) in the fuel housing have swirl vanes to impart a swirling motion to the fuel before it is supplied to the prefilmer 14. Beneficially, the fuel is provided to the surface 14 with a uniform distribution.

The outer swirler passage 22 is provided with an elbow 23 that gives a strong area contraction to increase the peak velocity of the air flow. The generated high velocity, swirling flow interacts with the atomised fuel to produce a well dispersed fuel and air mixture.

The pilot injector must provide a stable flame throughout the operating range of the combustor. Stability can be improved by operating the injector in a rich mode i.e. more fuel than stoichiometrically required. However, operating the combustion rich can give rise to the generation of smoke and unburned hydrocarbons as well as excessive fuel usage. Operating the combustion lean can result in too much air and problems of weak extinction. Typically 8% to 20% of combustor air passes through the pilot injector.

Airspray pilot injectors offer advantages over simple pressure-jet injectors. For example, they generally give less smoke at high pressures than a pressure jet and also offer improved ignition during re-light because of more complete atomisation.

Figure 3:
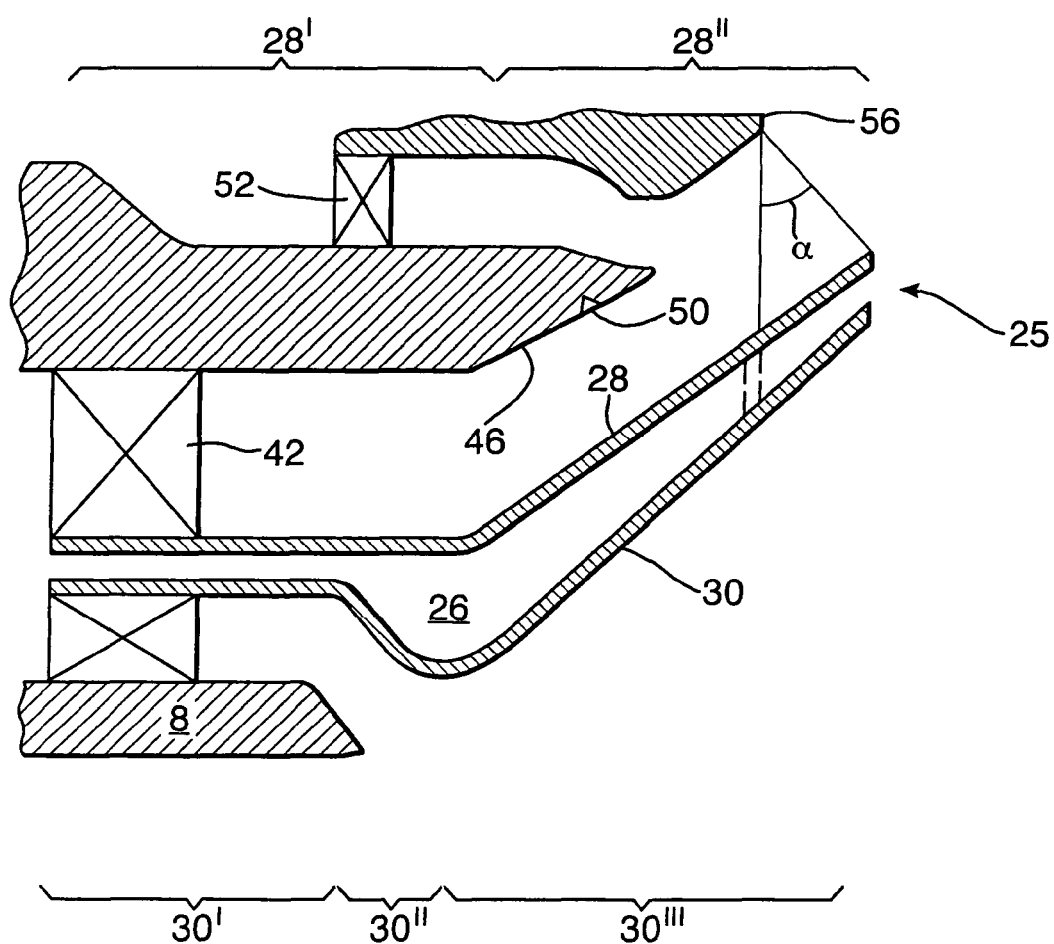
FIG. 3 depicts an embodiment of the injector with an elongate splitter.

The flame produced by the pilot injector is protected from a main injector air flow by a splitter 25. The splitter has a radially inner surface 30 and a radially outer surface 28. The radially inner surface is profiled to provide a columnar portion 30', a converging portion 30'' that converges to a throat and a diverging portion 30''' (FIG. 3). The radially outer surface 28 is also profiled to provide a columnar portion 28' that extends to an elbow and a radially outwardly extending outboard cone 28'' that directs main injection air away from the pilot combustion zone.

The radially inner surface 30 and the radially outer surface 28 are connected at a downstream end by a bulkhead 34. Between the radially inner surface and the radially outer surface is a cavity 26 and the splitter is substantially hollow. At the upstream end of the cavity metering apertures 32 are provided to allow a preselected volume of air to enter the hollow cavity at a preselected velocity. The volume of air is selected, at least in part, to provide sufficient cooling functionality to the splitter such that aerodynamic features may be maximised.

The prefilmer lip is located upstream of the throat so that the fuel is atomised at the prefilmer lip as the air flow is accelerating. This improves atomisation and entrainment of the fuel in the swirling air.

The angle of divergence from the throat of the radially inner surface 30 of the splitter 25 is between 35 and 60 degrees and is selected to allow the swirling flow from the pilot injector 10 to remain attached to the inner surface of the splitter 25 to create a central recirculating zone of relatively low velocity, which improves flame stabilisation and maximises altitude ignition performance. The angle permits the flame to come close to the splitter. The proximity of the flame to the splitter and the concomitant thermal issues being enabled by the thermal management and hollow bodied splitter 25.

The high peak flow enabled by the outer pilot swirl passage permits a good mixing of air and fuel in a relatively short injector. Accordingly, a pre-mixing chamber is not required which allows the flame to be brought closer to the injector.

Beneficially, by locating the flame close to the splitter, the flame is protected, the risk of flame-out is reduced and pressure perturbations in the combustor reduced.

Vents 36 are provided in the downstream bulkhead 34 to vent the air supplied to the cavity into the combustor 105. Between 1% and 7% and preferably between 2% and 5% of the total combustor air passes through the splitter cavity 26. The metering device and the vents 36 provide a pressure drop that is between 10% and 90% of the total pressure drop across the injector 17.

The main injector is located radially outside the pilot injector. The main injector has a radially inner swirl passage 38 defined between the radially outer surface 28 of the splitter and the radially inner surface of the main fuel housing 44. The inner main swirl passage 38 has an array of inner swirl vanes 42 that swirls the main flow of air. Approximately 50% of combustor air passes through the inner swirl passage 38.

The fuel housing 44 defines a prefilmer 46 and supports a fuel supply that opens into an annular swirl slot 50 in the prefilmer face. Fuel is supplied as a film to the prefilmer and remains as a film to the prefilmer lip 48 where it is atomised in the swirling air flow. An outer swirl passage 52 is located radially outside the fuel housing 44 and an array of swirlers 54 generate swirling flow that mixes with the atomised fuel to create a highly dispersed air and fuel mixture.

The main injector provides fuel to the combustor at high power loadings with the fuel being ignited by the pilot flame. It is desirable to control the manner in which the pilot flame and the main combustion zone interact. The apertures 36 in the downstream face 34 of the splitter direct the gas stream exiting the cavity 26 between the pilot combustion zone and the main combustion zone. The metered cooling air from within the splitter is fed through the apertures with a momentum that forces the interaction between the main combustion and the pilot combustion downstream from the bluff face 34.

The downstream face 34 can generate pockets of low pressure and eddies in the flow that can affect the mixing of the main zone with the pilot zone. By controlling a feed of air through effusion vents or apertures 36 in the bluff face and by pushing the point of interaction between the two zones downstream the manner in which the pilot flame and main combustion zones interact is improved.

The splitter 25 may be extended downstream into the combustor as depicted in FIG. 3 and the improved cooling afforded by the cavity 26 prevents damage despite its location in the hot combustion gasses. By extending the splitter a short premixing chamber is generated for the main airblast injector which allows the fuel to be better dispersed before injection into the combustion chamber.

The elongated splitter additionally acts as a heat-shield which protects the prefilmer of the main airblast injector from being significantly affected by the high temperatures in the combustor. In particular, when the engine is operating at low power on pilot fuel only, damage which may be caused if the prefilmer is in direct line of sight of the combustion zones is avoided.

Additionally, the stability of the fuel film on the main injector is affected by pressure fluctuations in the combustor. By isolating the prefilmer from the combustor using the elongate splitter acting as a heatshield a more uniform fuel film is provided on the prefilmer which enables a more uniform ignition and a more stable flame. A more stabile flame allows emissions to be reduced.

The exit plane of the premixer in this embodiment is preferably at an angle θ to a radial plane between the axially rearward tip 56 of the main injector housing and the splitter. No combustion occurs within the premixing chamber. θ is preferably between 5 and 20 degrees. Beneficially the air and fuel mixture is directed radially outwards and downstream to further delay mixing with the pilot zone.

Figure 4:
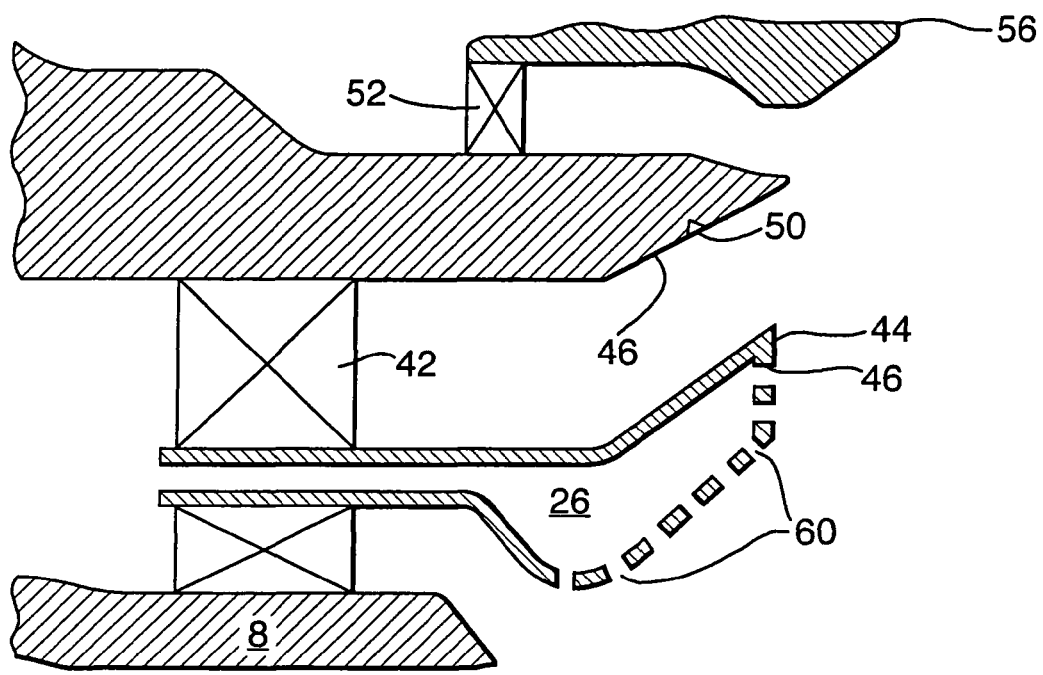
FIG. 4 depicts a further embodiment of the invention.

The splitter and operation of the injector may be further improved by providing a series of apertures 60 to the pilot combustion zone as depicted in FIG. 4. The apertures which extend from the cavity 26 inside the splitter 25 to the pilot zone serve to inject a volume of air that increases the Air Fuel Ratio (AFR) within the zone, which reduces smoke generation. The location of air injection does not significantly affect the stability or extinction characteristics of the pilot zone. The series of apertures are located at or just downstream of the throat. However, they may extend across the whole of the internal surface of the splitter between the throat and the downstream end.

The above embodiments have been described with the main inner swirl passage being annular. In alternative embodiments the outer surface of the splitter, which is generally annular is replaced with a surface that contains discontinuities such as undulations and the like and is embodied in FIG. 5. The inner surface 62 of the outer fuel manifold has a constant radius which maintains a uniform flow of air over its surface and from their over the prefilmer.

The discontinuities of the outer surface of the splitter affects the mainstream flow through the inner swirl passage and generates cyclical variability. Cyclical variation has been found to generate a reduction in the amplitude of combustor oscillations, or rumble, which can be a problem particularly when the combustor runs lean.

Figure 5:
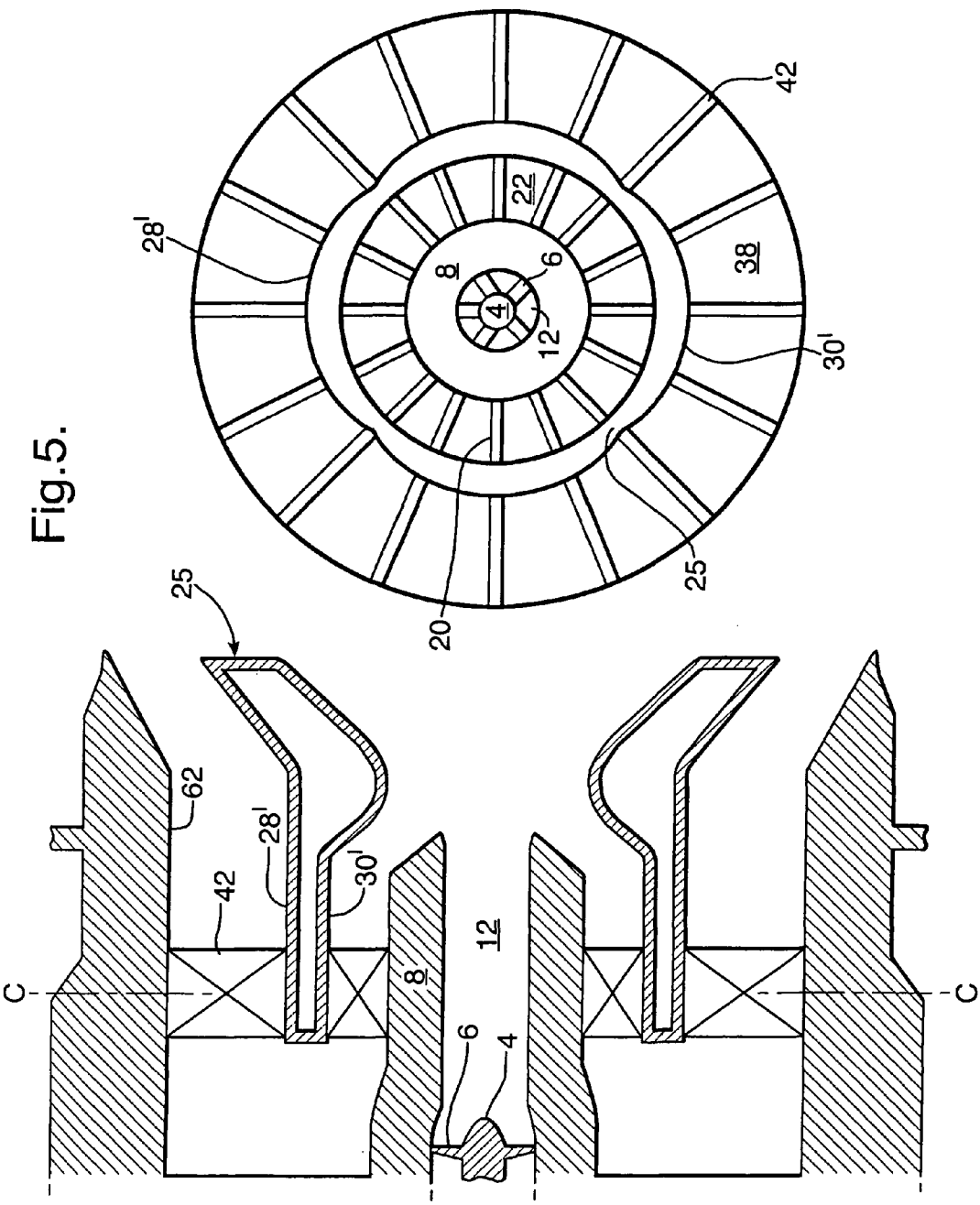
FIG. 5 depicts a further embodiment of the invention.

The embodiment of FIG. 5 a splitter having four lobes is depicted. The invention also works in a similar manner where more or less lobes are provided e.g. where the splitter provides eight lobes or, in the case of an elliptical splitter, two lobes. The total rumble generated in the combustor may be further reduced by altering the orientation of the lobes within adjacent fuel injectors when supplied as a set.

Various modifications may be made without departing from the scope of the invention. In particular, components described with respect to one or more of the embodiments may be interchangeable with similar components described in other embodiments.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A fuel injector head for a gas turbine engine comprising:
   a pilot injector having a central axis, the pilot injector being arranged to direct fuel and air to a pilot combustion zone;
   a main injector located radially outwardly of the pilot injector and being arranged to direct fuel and air to a main combustion zone;
   a splitter separating the pilot injector from the main injector the splitter having a radially inner surface and a radially outer surface and an end face connecting the inner surface with the outer surface, wherein
   the end face has a plurality of directing apertures for directing air directly into a combustor chamber, the plurality of directing apertures being supplied with air from a passage within the splitter,
   the passage has a plurality of metering apertures to meter the flow of air in the passage and a momentum at the plurality of directing apertures, the momentum being sufficient to delay mixing of the pilot and main combustion zones,
   the radially inner surface of the splitter defines a first portion which tapers radially inwardly to a throat and a second portion which tapers radially outwardly from the throat to the end face, and
   an angle of the radially outwards taper is such that a flow of air in use over the radially inner surface remains attached over a length of the surface.

2. The fuel injector head according to claim 1, wherein a sum of a pressure drop across the plurality of metering apertures and the plurality of directing apertures is from 10% to 90% of a pressure drop across the injector.

3. The fuel injector head according to claim 1, wherein the plurality of directing apertures are effusion vents.

4. The fuel injector according to claim 1, wherein
   the splitter separates the pilot injector from the main injector and bounds at least part of a premixing duct through which in use a fuel injected by the main injector flows and is mixed with air,
   an exit of the premixing duct has an exit plane, and
   a radially outer edge of the exit plane is located axially rearward of a radially inner edge of the exit plane.

5. The fuel injector according to claim 4, wherein the main injector has a prefilmer over which in use a film of fuel extends to a prefilmer lip where the film is atomised, the prefilmer lip defining the radially outer edge of the exit plane.

6. The fuel injector according to claim 4, wherein
   the main injector comprises a prefilmer having a lip and an inner annular passage for the supply of air over the lip and a concentric outer annular passage for the supply of air over the lip, and
   the outer annular passage has a radially outer wall the end of which defines the radially outer edge of the exit plane.

7. The fuel injector head according to claim 6, wherein the pilot injector further comprises an annular outer bore concentric with the central axis for the supply of air over the prefilmer lip.

8. A fuel The fuel injector according to claim 4, wherein an intersection of the radially outer surface of the splitter and the end face of the splitter provides the radially inner edge of the exit plane.

9. The fuel injector according to claim 4, wherein an angle of the exit plane from a radial plane is from 5 degrees to 20 degrees.

10. The fuel injector according to claim 1, wherein
    the radially inner surface of the splitter bounds a duct through which in use a fuel injected by the pilot injector flows, and
    the splitter has at least one aperture for the supply of a non-combustible fluid to the duct.

11. The fuel injector head according to claim 1, wherein
    the pilot injector comprises an annular pilot fuel housing concentric with the central axis,
    an inner surface of the annular pilot fuel housing providing a prefilmer surface for the supply of fuel thereto in a form of a film extending to a prefilmer lip wherein the inner surface of the annular pilot fuel housing defines a bore for the supply of air over the prefilmer.

12. A gas turbine engine incorporating the fuel injector head according to claim 1.

13. The fuel injector head according to claim 1, wherein the passage flares at an angle that is substantially the same as the angle of the radially outwards taper.

14. The fuel injector head according to claim 1, wherein the radially outer surface of the splitter has a portion that tapers radially outwards to the end face.

15. The fuel injector head according to claim 14, wherein the portion of the radially outer surface of the splitter tapers at an angle from the axis that is the same as the taper angle of the radially inner surface.

* * * * *